INVENTOR
HOWARD H. RAMBO

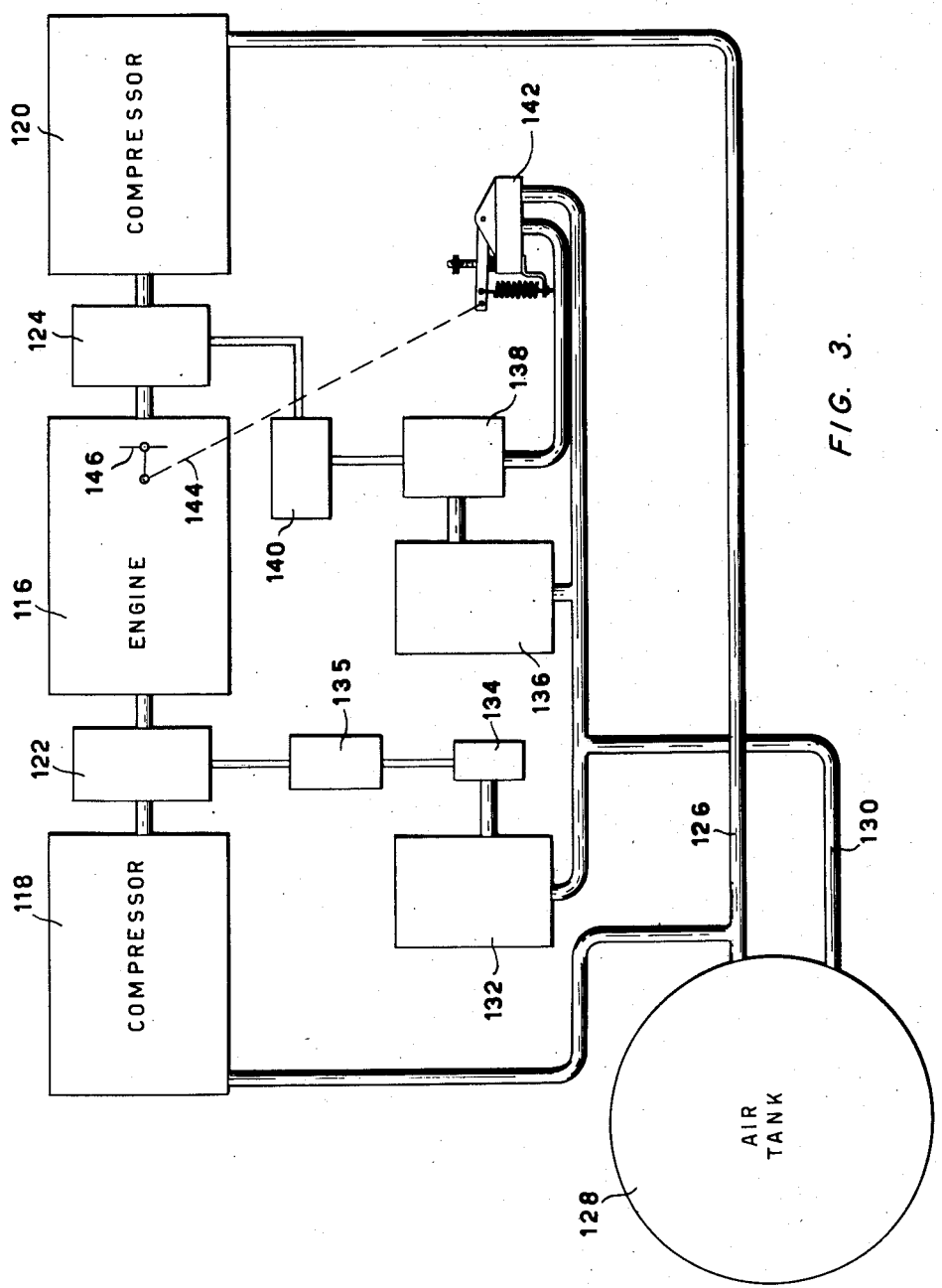

Patented May 19, 1953

2,639,083

UNITED STATES PATENT OFFICE 2,639,083

CONTROL MECHANISM FOR ENGINE DRIVEN COMPRESSORS

Howard H. Rambo, West Chester, Pa., assignor to Schramm, Inc., West Chester, Pa., a corporation of Pennsylvania Application May 8, 1948, Serial No. 25,888

1 Claim. (Cl. 230—3)

This invention relates to control means for engine driven compressors and has particular reference to the control and unloading of a driving engine in accordance with pressures in a compressed air tank.

Heretofore, it has been customary to produce unloading of a compressor when the pressure in the air supply tank reaches a certain maximum value with simultaneous reduction of the engine speed to an idling speed from the full speed thereof. This condition was then maintained until a predetermined minimum pressure existed in the supply tank whereupon the engine was speeded up to full speed and reloading of the compressor occurred with some slight delay necessary to permit the engine to pick up speed and prevent stalling. One of the most satisfactory types of unloading which was used involved maintaining open the inlet valves of the compressor so that air drawn into the cylinders would be discharged through the inlet ports without requiring absorption of large amounts of energy.

In the application of Repscha and Fox, Serial No. 761,092, filed July 15, 1947, Patent No. 2,595,369, May 6, 1952, an improvement is proposed involving control of the speed of an engine in proper relationship to the demands on the compressor driven thereby and, in particular, with the maintenance of operation of more continuous nature than has occurred heretofore. In accordance with the invention of that application the engine will operate at full speed when the pressure in the supply tank is at its minimum value. As this pressure increases the speed of the engine will be gradually reduced until when the maximum pressure desired in the supply tank is approached the engine may be operating at half speed or some other suitable fraction of its full speed. Then when the maximum pressure is reached through a slight increase of pressure unloading will occur and the engine will be slowed down to an idling speed. As air is drawn from the tank and the pressure therein decreases the engine continues to operate at idling speed until a predetermined value of pressure is reached when in quick succession the engine is brought up to the speed corresponding to the pressure in the tank and the compressor is reloaded with a repetition of the cycle. It will be obvious that the cycle just described involves longer periods of operation of the engine at speeds less than full speed when the demands on the compressor are moderate, i. e., there is an operation of the engine corresponding more nearly to the demands on the compressor to approach continuous operation. The result is less wear on the engine as well as on the parts which are involved in the unloading operation.

The general object of the present invention is to improve still further the characteristics of operation of an engine-compressor unit. In accordance with the present invention the system of the Repscha and Fox application is preferably involved to the extent that the engine speed is controlled. However, instead of continuing the drive of the compressor when the engine is idling, with unloading in the usual fashion, the engine is coupled to the compressor through a magnetic clutch so that unloading of the system is effected by causing disconnection of the clutch with the result that when the engine is idling the compressor is stationary. That this system is satisfactory in operation is due to the characteristics of a magnetic clutch in coupling the engine to the compressor in a transiently yielding fashion so that although slippage is eliminated almost immediately after the clutch is energized, nevertheless the application of the compressor load to the engine is sufficiently delayed that the engine may pick up the compressor without stalling, the engine throttle being, of course, opened to increase its power simultaneously with the engagement of the clutch.

While as indicated the invention desirably involves control of the engine speed dependent upon the pressure in the air tank, it is not essential, in accordance with the present invention, to provide for such continuous control of engine speed, but rather the engine may be operated at only two speeds, idling speed and full speed.

In accordance with the invention it is also possible to have an engine drive two or more compressors so arranged as to involve a fairly continuous operation of one compressor with a degree of intermittent operation of the other depending upon the air demand on the system.

The various general objects of the invention have been indicated above and involve the attainment of the specified results. These and other objects particularly relating to details of construction and operation will become apparent from the following description read in conjunction with the accompanying drawings in which:

Figure 3 is a diagrammatic view illustrating the fashion in which an engine may drive a pair of compressors to achieve the advantages of the present invention.

Figure 1:
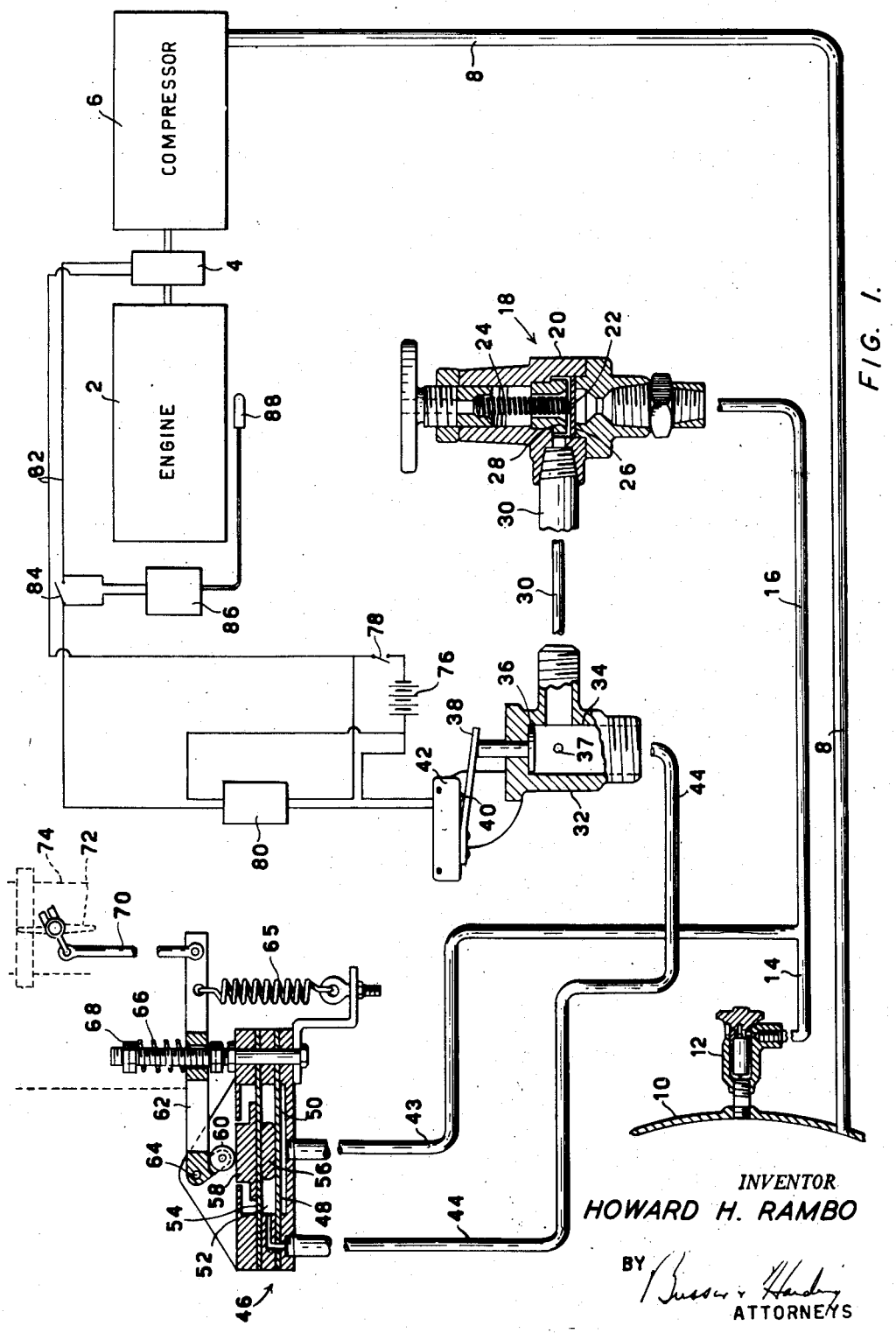
Figure 1 is a diagrammatic view illustrating certain mechanical parts of the invention in section.

Referring first to Figure 1, there is indicated at 2 an internal combustion engine which may be of the gasoline driven type or of a diesel type. This is arranged to be coupled through a magnetic clutch indicated generally at 4 and shown in detail in Figure 2 to a compressor 6. The advantages of the invention are particularly great when the compressor is of the positive displacement piston type but, as will be evident to those skilled in the art, the invention is applicable to the drive of other compressors, for example centrifugal compressors.

Various parts illustrated in Figure 1 will be found to have their counterparts in said Repscha and Fox application and in Gustafson Patents 2,023,418 and 2,160,860 dated, respectively, December 10, 1935, and June 6, 1939. The compressor is illustrated as delivering compressed air through a connection 8 to the air supply tank 10 from which it is withdrawn as used. A line 14 receives air from the tank through a water and oil filter 12 of conventional type and is arranged to deliver air through the connection 16 to an unloader valve 18. This comprises a casing 20 in which is located a disc 22 operating between a lower seat 26 and an upper seat 28, the disc being normally urged downwardly by a spring 24. The space above the seat 28 is open to the atmosphere. The space below and inside the seat 26 is connected to the line 16. Reference to the aforementioned Gustafson patents will reveal that the unloader valve is essentially as indicated in those patents. An air delivery connection 30 serves to feed air when the disc 22 is in upper position to an air switch device comprising a housing 32 provided with a cylinder bore 34 in which is located a piston 36 arranged to act upon a spring 38 secured to the body 42 of a conventional microswitch, the arrangement being such as to operate the button 40 of that switch. Downward movement of the piston 36 is limited by a transverse pin 37. A connection 44 from this air operated switch device leads to a control device which also receives air directly from the line 14 through the connection 43.

The control device which is indicated generally at 46 involves members forming a housing in which are mounted diaphragms 48 and 54 to define a lower chamber 50 in communication with the line 43 and an intermediate chamber 52 in communication with the line 44. A spacer 56 is located between the diaphragms and the upper face of the diaphragm 54 carries a member 58 on which bears a roller 60 carried by a lever 62 pivoted to the device 46 at 64. The lever 62 is urged downwardly by a tension spring 65 and also by an adjustable compression spring 66, the pressure exerted by which is varied through nuts 68. A link 70 connects the end of lever 62 with the throttle valve 72 in the intake connection 74 of the engine 2. The intake connection 74 is connected to the carburetor and intake manifold of the engine. It may be here noted that in the diagram of Figure 1 in order to promote clarity the parts are not indicated in their conventional physical relationships; for example, usually the air tank is mounted directly adjacent to the compressor and, of course, the intake connection of the engine would normally be mounted directly thereon. It may also be noted that while direct control of a throttle is illustrated as would be the normal control in the case of a gasoline engine, the control might well control a conventional governor which in turn controls the throttle, and in the case of a diesel engine the connection 70 might control the operation of a fuel valve or pump or the conventional governor. In any event, the power output of the engine is controlled through movement of the lever 62.

The diaphragms 48 and 54 are flexible and hence the effective area of the diaphragm 48 is the area of the spacer 56 in contact with it, while the effective area of the diaphragm 54 is the area of the member 58 in contact with it. The latter area will be noted to be substantially greater than the former. It is also to be noted that the roller 60 as arranged on the lever 62 is such that as movement is imparted to the lever the effective lever arm at the roller 60 is substantially increased. This is desirable for the most satisfactory type of operation.

The electrical elements of the system illustrated in Figure 1 are illustrated as energized from a battery 76 which will, of course, have conventional connections to a charging generator and to an engine starting motor. Since these and other details, including safety devices, are conventional they are not illustrated and the electrical connections in the diagram are reduced to their elemental form. A main switch 78 is indicated, manual closure of which supplies current to the microswitch 42 and to a relay 80 which is controlled by the microswitch. The relay 80 which is of conventional type is preferably a mercury relay and is interposed in the system merely because it will tolerate inductive surges of current which are produced in the magnetic clutch circuit. This relay 80 controls the flow of current to the clutch 4 through the lines 82 in which are interposed a manual switch 84 in parallel with a temperature-responsive switch 86 operated through a conventional connection to a thermally responsive liquid-containing bulb 88 which is located adjacent to the engine to respond to a warmed-up condition of the engine; for example, by being immersed in the cooling water system of the engine. The object of this switch is to permit closing of the magnetic clutch circuit, when the manual switch 84 is open only after the engine has warmed up to a suitable operating temperature. By the use of this arrangement the engine may be started but even though pressure conditions are such that the clutch 4 would normally be engaged, until the engine has warmed up, the clutch will not be energized and hence the compressor will remain idle. This is particularly desirable for the initiation of operation in very cold climates where injury to the engine might result if it were loaded when cold. For purposes of general description, however, it will be assumed that the engine has been warmed up and the switch 86 is closed.

Figure 2:
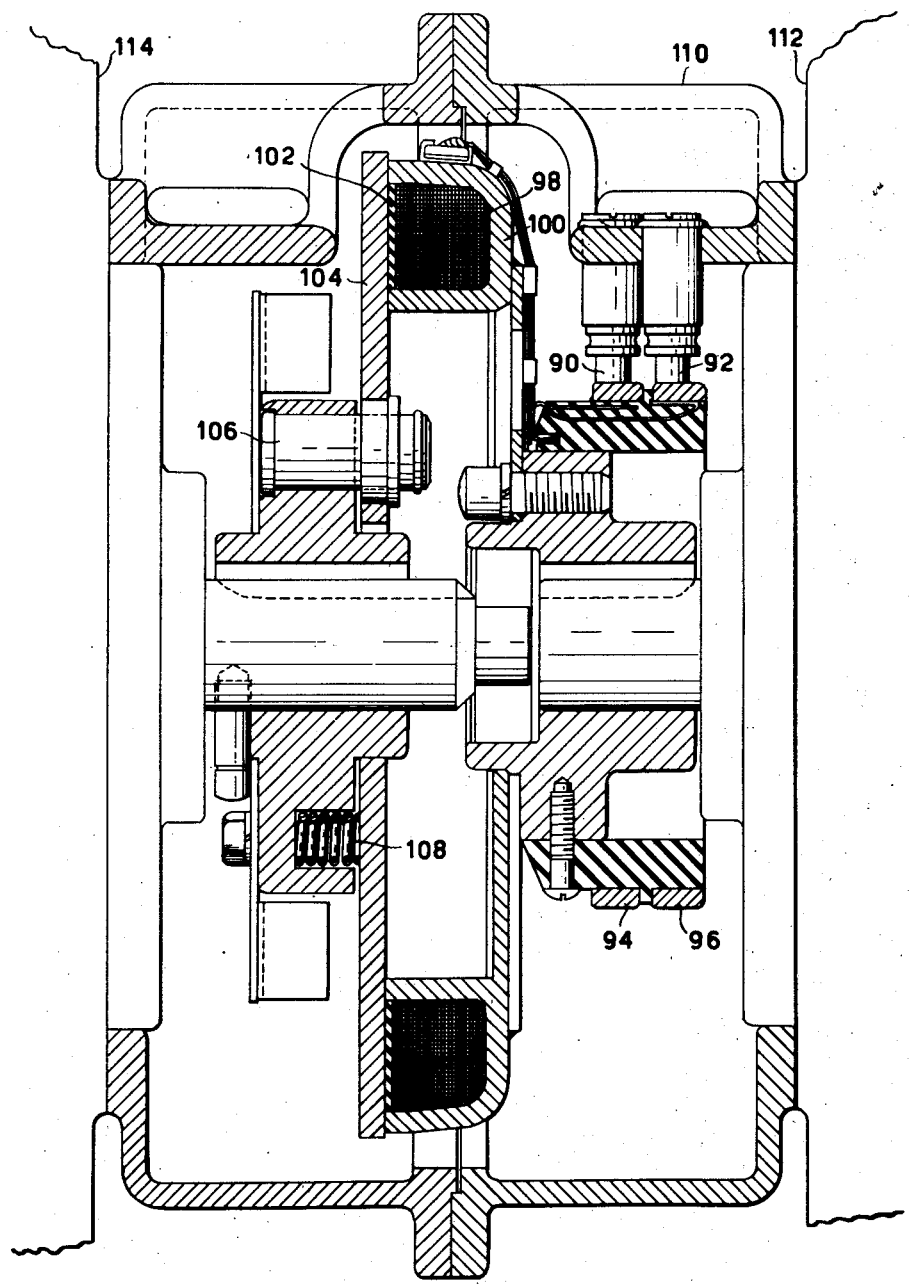
Figure 2 is an axial sectional view illustrating the kind of magnetic clutch which is found to be particularly satisfactory.

Before proceeding with a description of the operation reference may be made to Figure 2 which illustrates a preferred type of clutch used in this system. Brushes 90 and 92 connected to the lines 82 engage slip rings 94 and 96 to which are connected the terminals of the clutch coil 98 which is carried by the element 100 of the clutch which is keyed to the compressor shaft. Friction material 102 is arranged to be engaged by the plate 104 which is connected to the element of the clutch connected to the engine shaft through pins 106, light springs 108 normally maintaining a light frictional engagement between the plate 104 and the material 102. A housing 110 encloses the clutch and may be bolted to the compressor crank case 112 and to the engine crank case 114.

The operation of the mechanism described will be best understood by considering initially that the tank 10 is at minimum pressure. Under these conditions the disc 22 rests on the seat 26 and the line 30 is vented to the atmosphere. The bore 34 of the switch operator 32 is also under atmospheric pressure and the microswitch 42 will be closed. Under these conditions the relay 80 closes the circuit through the magnetic clutch and the engine is accordingly coupled to the compressor. At this same time, through connection 43, the chamber 50 is subjected to the tank pressure while chamber 52 is under atmospheric pressure due to the connection of line 44 with the line 30 through the switch operator 32. The pressure in the chamber 50 acts only on the effective area of contact between the diaphragm 48 and the spacer 56 so that the upward force on the roller 60 is a minimum. The engine is accordingly operating at full speed driving the compressor which supplies air to the tank.

As the pressure in the tank rises the force acting on the roller 60 increases and the throttle valve 72 is moved correspondingly toward closed position. The fact that the valve 46 becomes more and more effective in throttling the intake as the lever 62 changes its angle is taken care of by the increased lever arm of the roller 60, the effect being an increased rate of change of the position of the lever 62 as the pressure in the chamber 50 increases. Adjustments may be made to secure any desired reduction in speed as the pressure in the tank 10 increases. For example, to consider for clarity typical figures, let it be assumed that the minimum tank pressure is 85 pounds per square inch and under such conditions that the engine operates at 1200 R. P. M. Then at a pressure such as 105 pounds per square inch the control of the throttle 72 may result in a decrease of the engine speed to 600 R. P. M., the speed variation between these figures being continuous with variation of pressure. If 105 pounds per square inch is regarded as the maximum tank pressure desired then the adjustment of the pilot valve 18 is such that at about this pressure value the disc 22 will be snapped upwardly against the seat 28 by the pressure beneath it with the result that the tank pressure is applied through the line 30 to the pneumatic switch 32 and thence through the line 44 to the chamber 52. The snap action of the pilot valve is as described in said Gustafson patents and need not be repeated here. It need only be noted that the area of the disc subjected to the tank pressure is substantially increased when it rises from the seat 26 so that it will not return to that seat until the tank pressure drops quite substantially. A stable snap action is thus secured.

When the tank pressure is applied to the chamber 52 it will then be acting upon the increased area represented by the excess area of the member 58 over the area of the spacer 56 and consequently a considerably greater force acts upon the roller 60. The throttle 72 is accordingly closed to idling position limited by the usual adjustable stop which is not shown. The engine accordingly has its speed reduced to idling speed which may, for example, be about 400 R. P. M.

At the same time the action of the air pressure applied to the pneumatic switch device 32 will cause the microswitch 42 to open its circuit and thereby through the mercury relay 80 open the circuit to the magnetic clutch 4 disconnecting the engine from the compressor. The engine accordingly comes to rest and this type of operation saves much wear on the compressor as contrasted with the mode of unloading heretofore used involving continuous operation of the compressor but with the inlet valve held open to effect unloading. The engine is, of course, relieved of even the burden of turning over the compressor so that substantial fuel saving is effected.

The conditions just indicated will then continue until the pressure in the supply tank drops to such value that the spring 24 will force the disc 22 downwardly against the seat 26. Consistent with the figures previously given this might, for example, occur at 90 pounds per square inch. Until this occurs, even though the tank pressure has decreased, the engine throttle will not be opened because the increased effective diaphragm area exposed to tank pressure is sufficient to hold the throttle in idling position.

As soon as the disc 22 is seated at 26 the lines 30 and 44 are open to the atmosphere. The throttle will be opened to provide an engine speed corresponding to the pressure then existing in the supply tank. At the same time the microswitch 42 is closed and the mercury switch 80 will close to energize the winding of the clutch 4. The engine and compressor will thus be coupled together. While the engagement of the clutch and attainment of a condition of no slip between the engine and compressor shafts occupies only a very small interval, nevertheless, it has been found that there is sufficient lag and slippage to permit the engine to assume the compressor load without any detrimental shock or stalling. The response of the engine to the throttle is, of course, very rapid in its idle condition and its rise to full speed takes place in only a short interval. The self inductance of the clutch winding is sufficient to cause a slight delay in clutching and until the current reaches the full value in the winding some slippage may occur. Accordingly, proper operation will result. It may be here noted that a magnetic clutch of the type illustrated is designed in such fashion as not to be damaged by a moderate amount of slippage between the clutch elements and it has been found that the life of a a clutch in the present system is very long and satisfactory.

The cycle which has been described will repeat periodically depending upon the demand of air from the tank. It will be evident that due to the continuous variation of engine speed with supply tank pressure, there will be a considerable range of demands on the supply tank less than the maximum demand corresponding to which unloading will not occur since the displacement of the compressor is reduced to the demand, through reduction of speed, and the tank pressure will not then rise to the unloading pressure. Only under conditions of a demand less than that corresponding to the lowest controllable speed of the compressor will the tank pressure rise to the pressure effecting unloading, i. e., throttling of the engine to idling speed and disengagement of the clutch. For sustained periods, accordingly, there will be continuous operation of the compressor at variable speeds less than full speed without the occurrence of an unloading operation. While this advantage of avoiding numerous starts and stops is attained in the system described in said Repscha and Fox application, it will be noted that such operation is particularly advantageous in the present system since there is avoided, to a maximum extent, engagement of the clutch which will produce some wear thereon. Not only are the engine and compressor operated at less than maximum speed through considerable periods to reduce wear thereon but the compressor is entirely stopped whenever unloading is achieved.

While as just indicated it is desirable to utilize the control of speed dependent upon pressure through the use of a control device such as 46, it will be evident that this speed control may be replaced by an on-off type of throttle control such as that of Gustafson Patent 2,023,418, i. e., the control may cause the throttle to be either fully opened or closed to idling position. The advantages of using the magnetic clutch will nevertheless be secured.

The invention may be applied in some cases to the drive of more than one compressor by a single engine. This is illustrated in Figure 3. The engine 116 is here coupled to the compressors 118 and 120 through the magnetic clutches 122 and 124, respectively. The compressors jointly deliver air through the line 126 to the air tank 128. From this tank the line 130 connects to two pilot valves 132 and 136, each of which may be identical in construction with that illustrated at 18 in Figure 1. The pilot valve 132 controls the pneumatic microswitch indicated at 134 similar to that previously described which, in turn, controls the mercury relay 135 in the circuit of the clutch 122. The pilot valve 132 has no control over the engine speed.

The pilot valve 136, on the other hand, is connected in a system which is the same as that of Figure 1, controlling the microswitch 138 and through it mercury relay 140 and clutch 124 and also controlling the operation of the control device 142 corresponding to the control device 46 connected through a linkage 144 to the engine throttle 146.

In the case of the system of Figure 3 the pilot valves 132 and 136 are set differently through adjustment of their springs corresponding to 24 of Figure 1. The pilot valve 132 is arranged to snap to disengage the clutch 122 upon the attainment of a tank pressure less than that required for similar operation of the pilot valve 136. Accordingly, the compressor 120 is the main compressor of the system and operates alone under conditions of such demands as will result in a tank pressure above that required to trip the pilot valve 132. On the other hand, greater demands will involve operation of the compressor 118. This compressor 118 will then operate considerably less in the aggregate than the compressor 120. As will be evident, a simple switch arrangement may be used to interchange the control connections for the two magnetic clutches so that if it is desired to equalize the lives of the two compressors they may be interchangeably operated as the main and secondary compressors.

It will, of course, be evident that the system of Figure 3 may be extended to the control of three or more compressors if the wide range of demands on the unit make that desirable.

Furthermore, it will be evident that the two clutches may be in series arrangement with respect to the engine; i. e., the engine may drive clutch 124 and through it the compressor 120, while the clutch 122 may be driven from the driven side of clutch 124 and in turn drive the compressor 118, the clutch 124 being thus interposed between the engine and both of the compressors. Depending upon the desired physical arrangement of the engine and the compressors, gear or belt drives may be variously provided, the same being, of course, true of the modification illustrated in Figure 1 as well.

What I claim and desire to protect by Letters Patent is:

In combination, a combustion engine, at least two compressors, a pair of magnetic clutches through which the engine drives the compressors, a tank connected to the compressors to receive compressed gas therefrom, a pair of pressure responsive pilot mechanisms, a first switch means, one of said pilot mechanisms operating in response to pressure in the tank and controlling said first switch means when the pressure in the tank reaches a predetermined value to disengage one of said clutches to stop one of said compressors, a second switch means, the other of said pilot mechanisms operating in response to pressure in the tank when it reaches a value greater than the first mentioned predetermined value to control said second switch means to disengage the other of said clutches to stop the other of said compressors, and means responsive to variations of pressure in the tank throughout a predetermined range of pressure therein to adjust the engine speed within a predetermined range of speeds in response to substantially any change in tank pressure and responsive to operation of said other of said pilot mechanisms to reduce the engine speed to idling speed when both of said compressors have been stopped.

HOWARD H. RAMBO.

References Cited in the file of this patent

UNITED STATES PATENTS

| Number | Name | Date |
|---|---|---|
| 773,523 | Richards | Oct. 25, 1904 |
| 1,560,041 | Christensen | Nov. 3, 1925 |
| 1,863,851 | Hughes | June 21, 1932 |
| 2,074,738 | Aikman | Mar. 23, 1937 |
| 2,187,712 | Neeson | Jan. 16, 1940 |
| 2,212,631 | Baker | Aug. 27, 1940 |
| 2,317,135 | Crittenden | Apr. 20, 1943 |
| 2,380,226 | Frantz | July 10, 1945 |
| 2,410,824 | Lamberton | Nov. 12, 1946 |
| 2,421,872 | Evelyn | June 10, 1947 |

FOREIGN PATENTS

| Number | Country | Date |
|---|---|---|
| 529,417 | Germany | 1931 |